UNITED STATES PATENT OFFICE 2,090,909

WATER SOLUBLE COMPOSITION

Ivor M. Colbeth, East Orange, N. J., assignor to The Baker Castor Oil Company, New York, N. Y., a corporation of Delaware No Drawing. Application June 7, 1933
Serial No. 674,693

6 Claims. (Cl. 252—6)

This invention relates to the production of a water soluble composition from non-mineral oils that is useful for many purposes, such as emulsifying agents, wetting out agents, mordanting agents, etc.

Heretofore sulfonated oils, Turkey red oils, and other soluble oils have been prepared by treating vegetable oils, such as castor, corn, olive, rape seed, cocoanut, etc., with sulfuric acid and then washing the product to free it from sulfuric acid, and neutralizing it with an alkali. The resulting product usually contained free fatty acids, anhydrides, lactones, polymerized acids, glycerides of different degrees of saturation and a considerable amount of sulfonic acids. These sulfonic acids are soluble in water, acids and alkalis, but constitute only a small percentage of the sulfonated oils. Such sulfonated oils have been used in the arts for different purposes.

However, such sulfonated oils are not entirely satisfactory as they possess certain properties that are detrimental and prevent successful use of them unless certain precautions are observed in their use. The combined sulfuric acid sometimes becomes hydrolyzed, especially in the presence of sodium chloride, thus setting sulfuric acid free which will destroy fiber when the oil is used for wetting out or mordanting purposes. Also, due to the fact that some of the fatty acids present are unsaturated, these oils become oxidized with the consequent formation of products which have an objectionable odor. These and other troubles are often magnified due to the employment of cheap vegetable oils to be sulfonated or resort to other expedients for the sake of economy.

By the present invention oils are rendered water soluble in a very rapid and economical way and at the same time the danger arising from acid hydrolysis is obviated and rancidity due to oxidation does not occur.

In carrying out this invention water soluble compositions are produced by oxidizing castor oil or other oils such as rape seed, cotton seed, corn, olive, cocoanut, soya bean, fish oil, etc. until they contain amounts of fatty acids, anhydrides, lactones and polymerized fatty acids comparable or approximately equal to those found in sulfonated oils heretofore obtained. After the desired amount of oxidation has taken place a sufficient amount of ricinoleic acid is added to make the resulting composition soluble in water when neutralized with alkalies.

The oxidation step can be carried out by heating the oil and blowing air therethrough in the manner already known in this art. The amount of oxidation required will depend upon the particular oil that is started with and to some extent upon the use to which the composition is to be put and can be readily ascertained by trial. The amount of ricinoleic acid to be added also depends upon what sort of oil is oxidized and the use to which the composition is to be put.

It has been found for example that when castor oil is used as the starting material it may be blown or oxidized until its iodine number is about 50 or 60 and it is then suitable for making the composition. About 5% to 50% by volume of ricinoleic acid may be added and well mixed with the oxidized oil. The free acids in the composition are then neutralized with an alkali such as caustic soda, caustic potash, ammonium hydroxide, triethanolamine, etc. When no inorganic materials are used for neutralization the final product is an organic product.

The compositions made as described above have been found to be very useful for different purposes in the form of emulsions, colloidal suspensions or solutions. The percentage of ricinoleic acid present is caused to vary in accordance with different uses to be made of the composition.

About 30% to 50% of glycerine may be dissolved in the composition, depending upon the amount of ricinoleic acid that had been added, thus rendering the composition especially adaptable for softening putty, molding clay, etc. where permanent softness is desired.

Due to the face that the oil used in the composition was oxidized before it was used in making up the composition the composition will not become oxidized or turn rancid when it is used in practice. The oil gains enough in weight during oxidization to pay the cost of the step, thus saving costs compared to prior sulfonation steps. Further economy may be effected since satisfactory compositions of this sort can be made by starting with oils cheaper than castor oil.

The following are given as specific examples of carrying out the process, but it is to be understood that the invention is not restricted to the particular oil, alkali or percentages mentioned.

Light-colored castor oil that has been oxidized by blowing air through it at an elevated temperature until its viscosity is about 350 seconds Engler at 100° C. is mixed with 30% by volume of ricinoleic acid and the mixture is neutralized with a 10% aqueous sodium hydroxide solution. The resulting composition may be used as a wetting out agent, as an alizarin assistant, or in the preparation of mordants, etc.

Or light-colored blown castor oil, described above, is mixed with 15% by weight of ricinoleic acid and a sufficient amount of a 10% aqueous solution of sodium hydroxide is added to neutralize one-third of the free acids present in the mixture. The resultant composition is an excellent lubricant or can be emulsified with water and used for treating textiles.

I claim:

1. A composition comprising a saponifiable oil in the group consisting of vegetable, animal and fish oil, which has been oxidized beyond the point where subsequent rancidity would occur by heating it and blowing air through it, and ricinoleic acid to the extent of about 5% to 50% by volume of said oil in addition to the ricinoleic acid originally present in the oil.

2. A composition comprising a saponifiable vegetable oil, which has been oxidized beyond the point where subsequent rancidity would occur, by heating it and blowing air through it, and ricinoleic acid to the extent of about 5% to 50% by volume of said oil in addition to the ricinoleic acid originally present in the oil.

3. A composition comprising a saponifiable castor oil, which has been oxidized beyond the point where subsequent rancidity would occur, by heating it and blowing air through it, and ricinoleic acid to the extent of about 5% to 50% by volume of said oil in addition to the ricinoleic acid originally present in the oil.

4. A composition comprising a saponifiable castor oil, which has been oxidized beyond the point where subsequent rancidity would occur, by heating it and blowing air through it until its viscosity is about 350 sec. Engler at 100° C. and ricinoleic acid to the extent of about 5% to 50% by volume of said oil in addition to the ricinoleic acid originally present in the oil.

5. A composition comprising a saponifiable oil in the group consisting of vegetable, animal and fish oil, which has been oxidized beyond the point where subsequent rancidity would occur, by heating it and blowing air through it, and a ricinoleate to the extent of about 5% to 50% by volume of said oil in addition to the ricinoleate resulting from ricinoleic acid originally present in the oil.

6. A composition comprising glycerine, a saponifiable oil in the group consisting of vegetable, animal and fish oil, which has been oxidized beyond the point where subsequent rancidity would occur, by heating it and blowing air through it, and ricinoleic acid to the extent of about 5% to 50% by volume of said oil in addition to the ricinoleic acid originally present in the oil.

IVOR M. COLBETH.